United States Patent [19]

Puharich

[11] 4,394,230
[45] Jul. 19, 1983

[54] METHOD AND APPARATUS FOR SPLITTING WATER MOLECULES

[76] Inventor: Henry K. Puharich, Rte. 1, Box 97, Delaplane, Va. 22025

[21] Appl. No.: 272,277

[22] Filed: Jun. 10, 1981

[51] Int. Cl.$^3$ .......................... C25B 1/04; C25B 1/10; C25B 9/04

[52] U.S. Cl. .................................... 204/129; 204/228; 204/260; 204/263; 204/266

[58] Field of Search ............... 204/129, 228, 260, 263, 204/266

[56] References Cited

U.S. PATENT DOCUMENTS 3,563,246 2/1971 Puharich ................................ 331/47
3,726,762 4/1973 Puharich .............................. 128/422
4,107,008 8/1978 Horvath .............................. 204/129

Primary Examiner—R. L. Andrews
Attorney, Agent, or Firm—Mandeville and Schweitzer

[57] ABSTRACT

Disclosed herein is a new and improved thermodynamic device to produce hydrogen gas and oxygen gas from ordinary water molecules or from seawater at normal temperatures and pressure. Also disclosed is a new and improved method for electrically treating water molecules to decompose them into hydrogen gas and oxygen gas at efficiency levels ranging between approximately 80-100%. The evolved hydrogen gas may be used as a fuel; and the evolved oxygen gas may be used as an oxidant.

9 Claims, 20 Drawing Figures

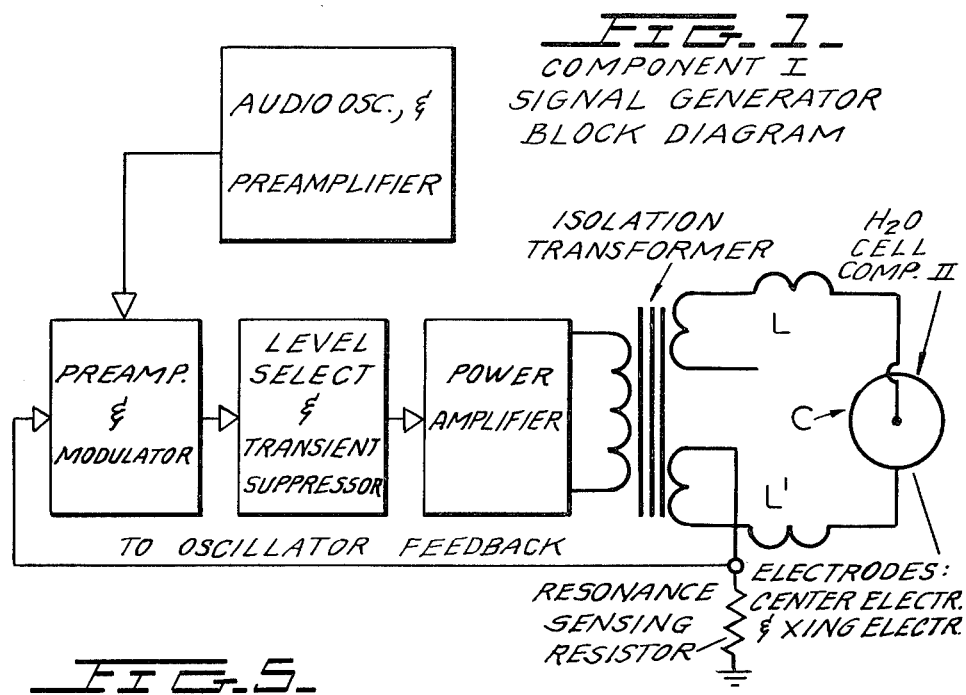
FIG. 1 — COMPONENT I SIGNAL GENERATOR BLOCK DIAGRAM
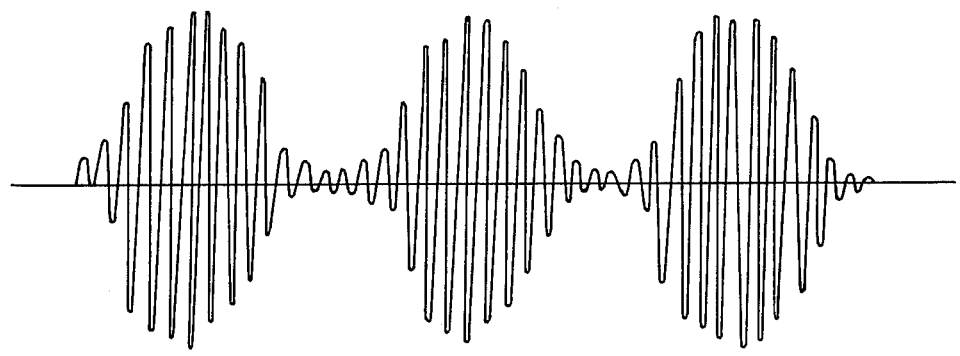
AMPLITUDE MODULATED 90° CARRIER SINE WAVE
HALF-WAVE VECTIFICATION OF ABOVE SIGNAL

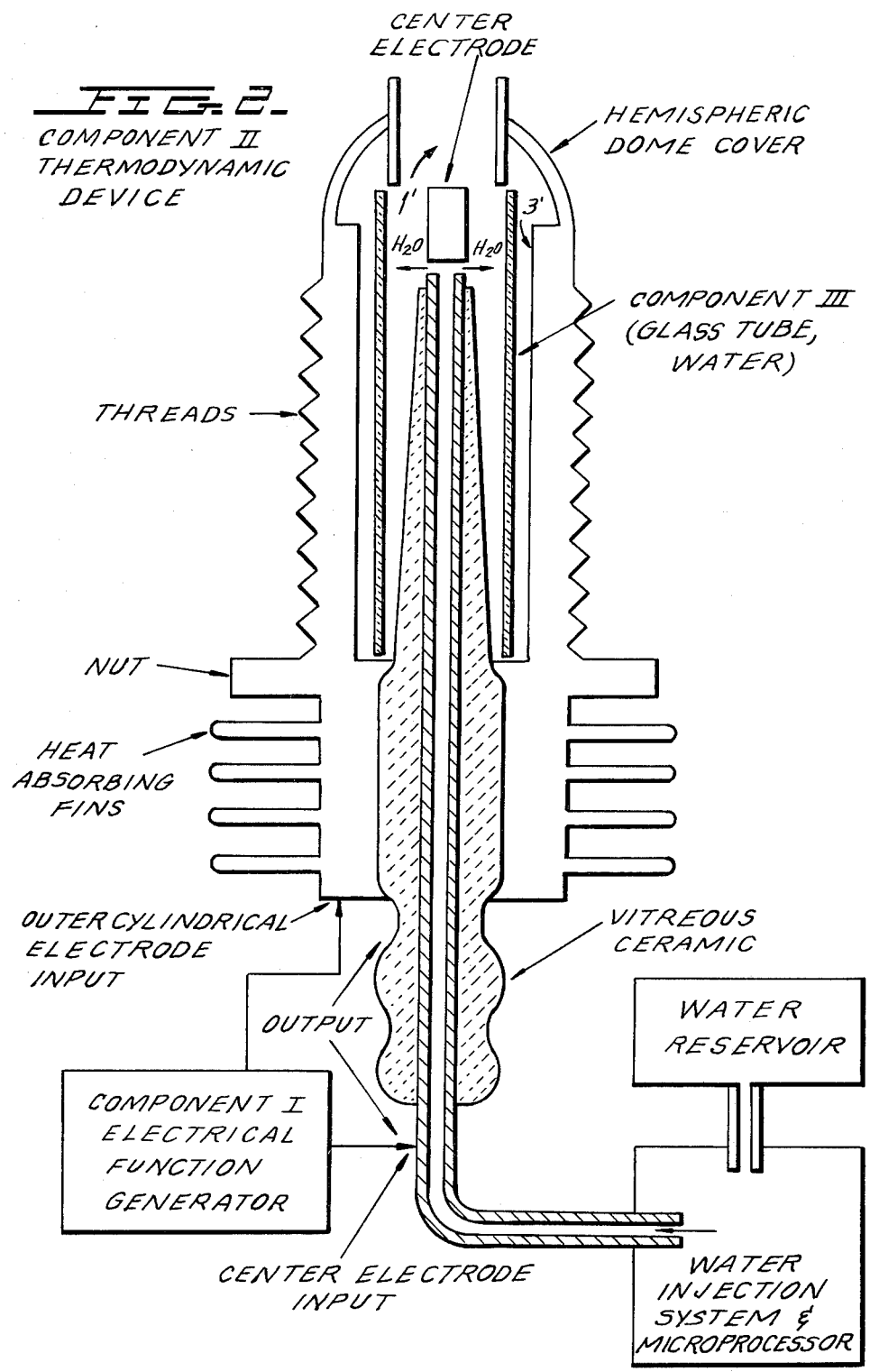

COMPONENT III.
THE WATER CELL SECTION OF COMPONENT II

UNHYBRIDIZED ORBITAL INTERACTION IN WATER BOND ANGLE IS 104° RATHER THAN 90° AS PREDICTED

FORMATION OF sp3 HYBRID ORBITALS

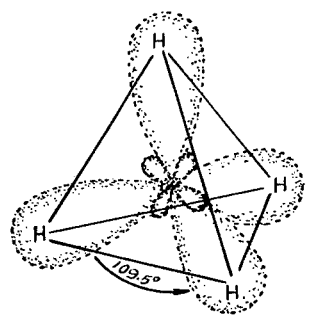
HYBRIDIZED METHANE MOLECULE $CH_4$
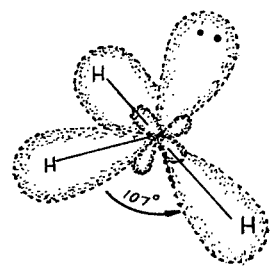
HYBRIDIZED AMMONIA MOLECULE $NH_3$
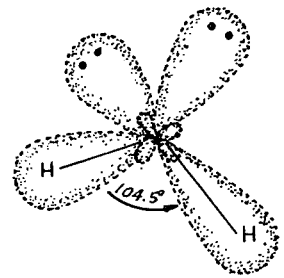
HYBRIDIZED WATER MOLECULE $H_2O$
FIG. 4C.
GEOMETRY OF METHANE, AMMONIA, AND WATER MOLECULES

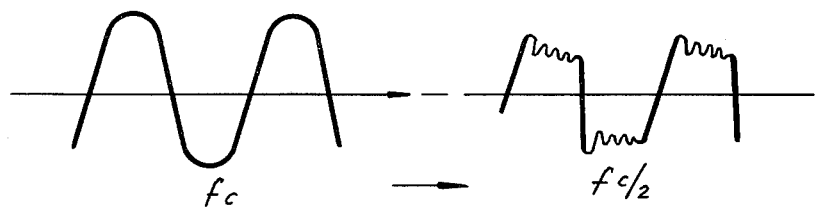
_FIG.6_
$f_c$ — $f_c/2$
p-p VOLTS = 1.3 VOLT      _FIG.6A_
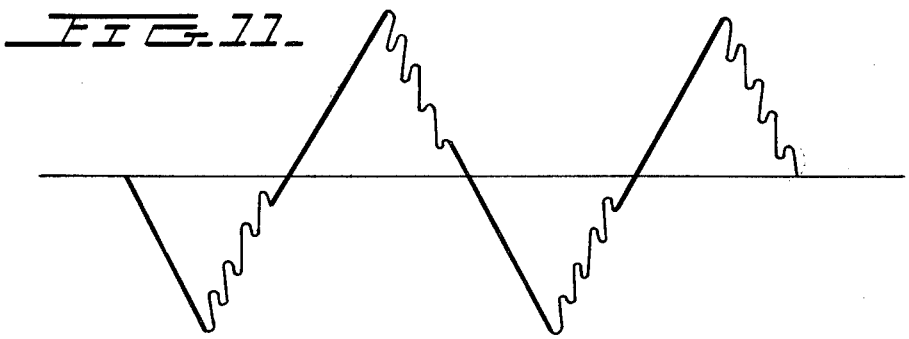
_FIG.11_
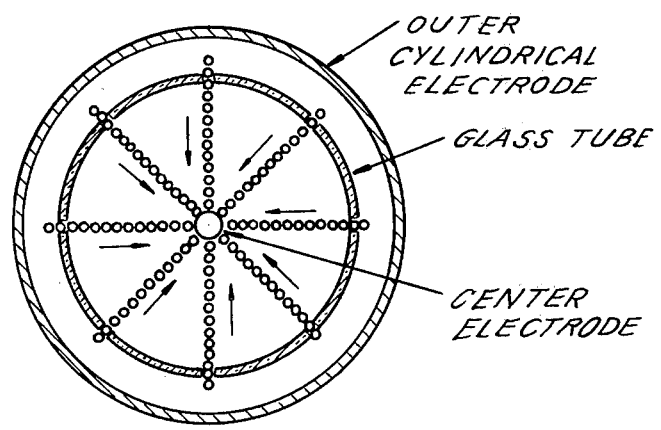
_FIG.12_
PEARL CHAIN FORMATION OF HYDROGEN GAS BUBBLES IN COMPONENT III AS SEEN FROM ABOVE
OUTER CYLINDRICAL ELECTRODE
GLASS TUBE
CENTER ELECTRODE

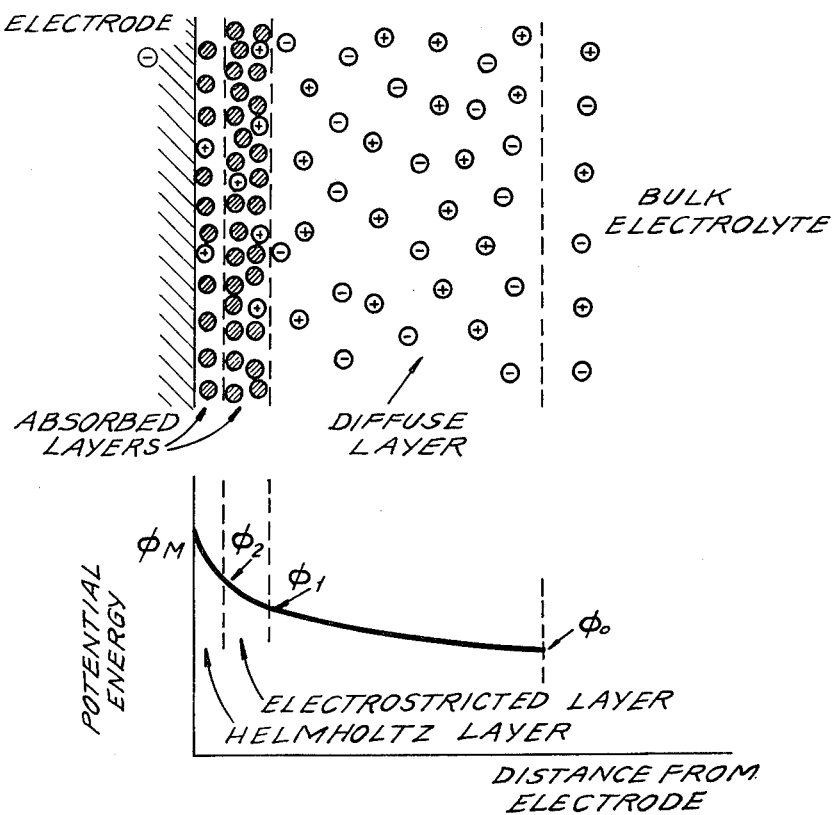

FIG._7_

DIAGRAM OF THE DOUBLE LAYER CLOSE TO A NEGATIVE ELECTRODE. THE POTENTIAL ENERGY OF POSITIVE IONS IN THIS REGION WHEN NO CURRENT IS FLOWING IS SHOWN IN THE LOWER DIAGRAM. $\phi_M - \phi_2$ IS THE ELECTRON TRANSFER POTENTIAL; $\phi_2 - \phi_1$ IS RELATED TO THE ACTIVATION OVERPOTENTIAL; AND $\phi_1 - \phi_0$ IS RELATED TO THE DIFFUSION OVERPOTENTIAL.

KEY
- ⊘ SOLVENT MOLECULE = $H_2O$
- ⊕ POSITIVE ION = $H^+$
- ⊖ NEGATIVE ION = $O^-$

FIG. 8.
EQUIVALENT TETRAHEDRAL BONDING ORBITALS OF WATER
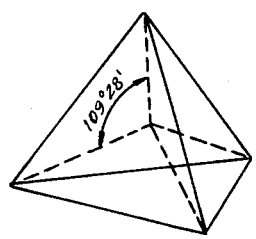
GEOMETRIC TETRAHEDRON
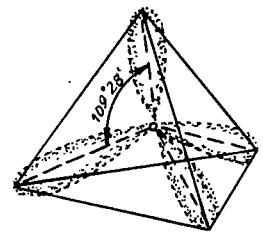
HYBRIDIZED BONDING ORBITALS OF WATER
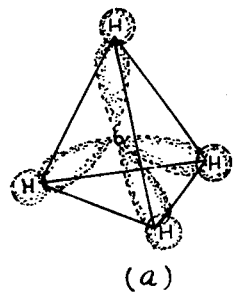
(a)
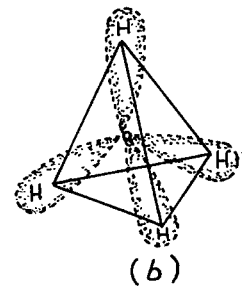
(b)
METHANE OVERLAP OF SPHERICAL 1s ORBITAL OF HYDROGEN WITH sp3 BONDING ORBITALS OF CARBON (a) RESULTS IN EQUIVALENT SIGMA BONDS, THE MOLECULAR ORBITALS OF (b).

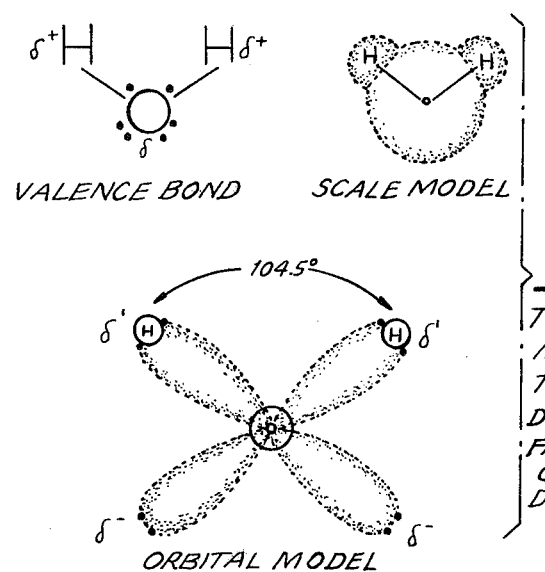
FIG. 9. THE WATER MOLECULE. THE WATER DIPOLE RESULTS FROM UNEVEN CHARGE DISTRIBUTION.
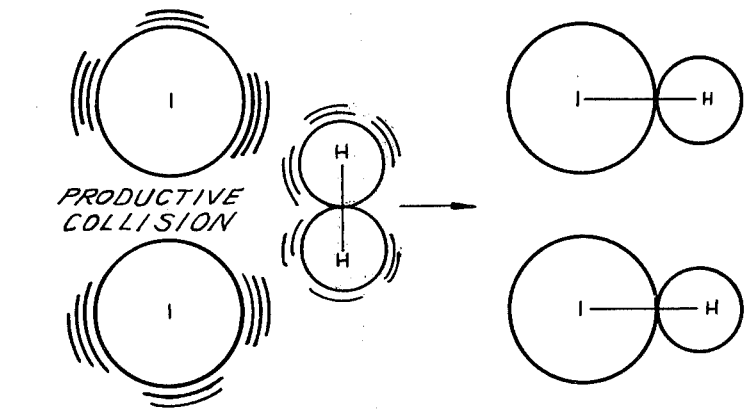
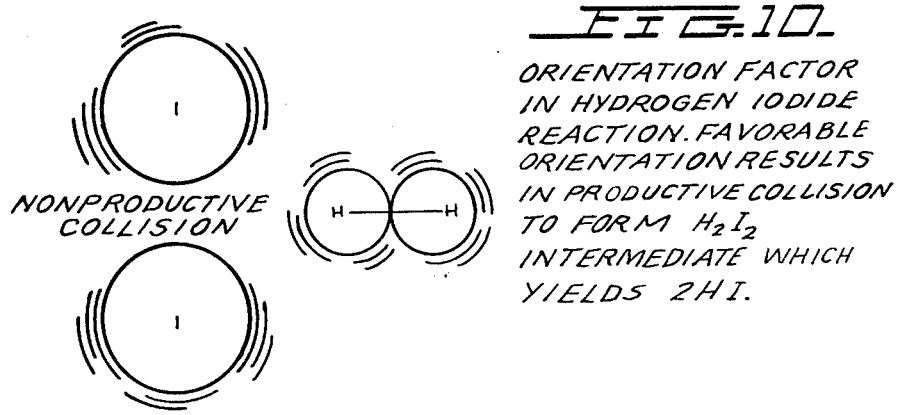
FIG. 10. ORIENTATION FACTOR IN HYDROGEN IODIDE REACTION. FAVORABLE ORIENTATION RESULTS IN PRODUCTIVE COLLISION TO FORM $H_2I_2$ INTERMEDIATE WHICH YIELDS $2HI$.

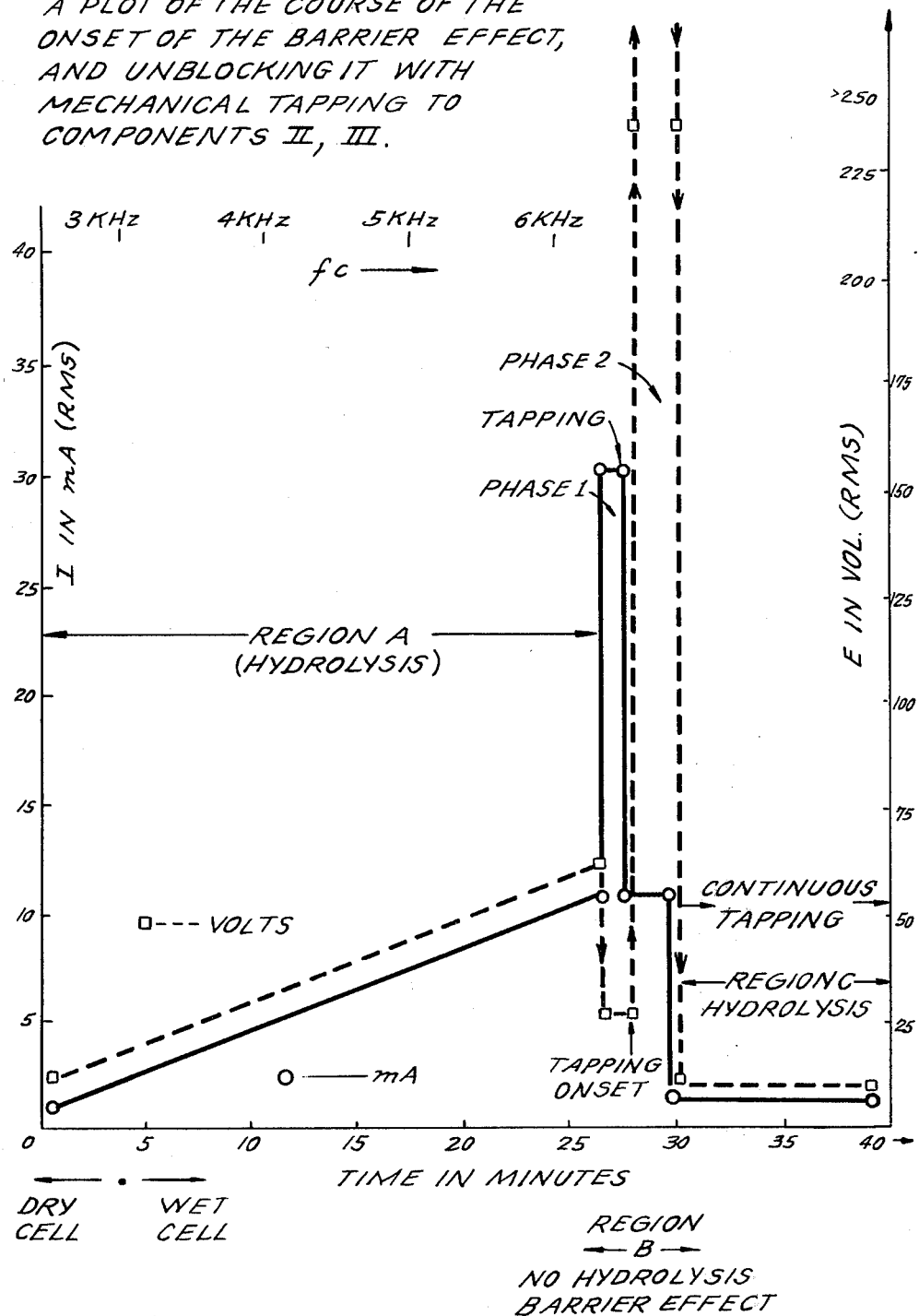

FIG.14A.

(a) AN EXERGONIC REACTION.
PRODUCTS HAVE A LOWER
POTENTIAL ENERGY THAN
REACTANTS, THEREFORE,
ENERGY IS RELEASED.

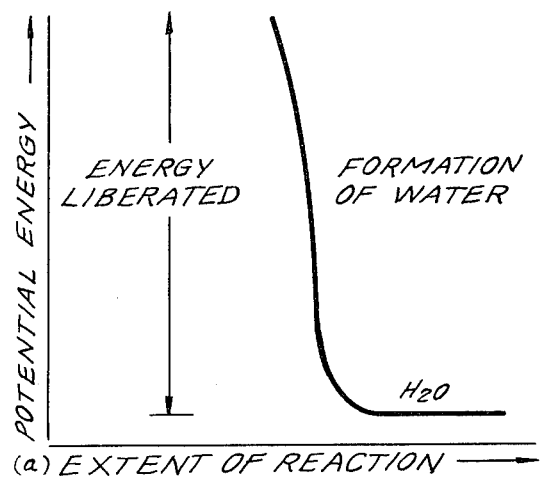

FIG.14B.

(b) AN ENDERGONIC REACTION
PRODUCTS HAVE A HIGHER
POTENTIAL ENERGY THAN
REACTANTS, CAUSING
ENERGY TO BE CONSUMED.

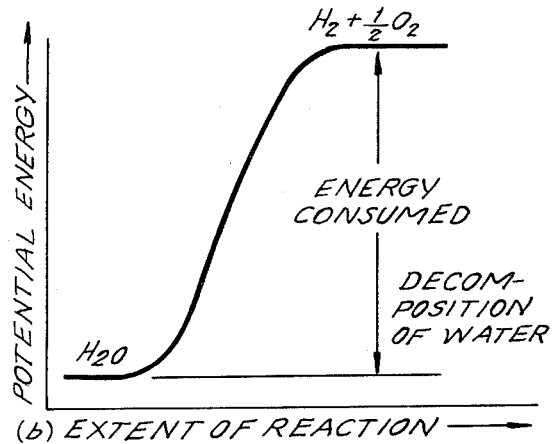

FIG.14C.

ENERGY DIAGRAM FOR
EXERGONIC REACTION.
ACTIVATION ENERGY
IS BARRIER TO BE
OVERCOME FOR
REACTION TO PROCEED,
& IS SUPPLIED AS A
"SPARK" TO THE GASES
TO GET IGNITION.

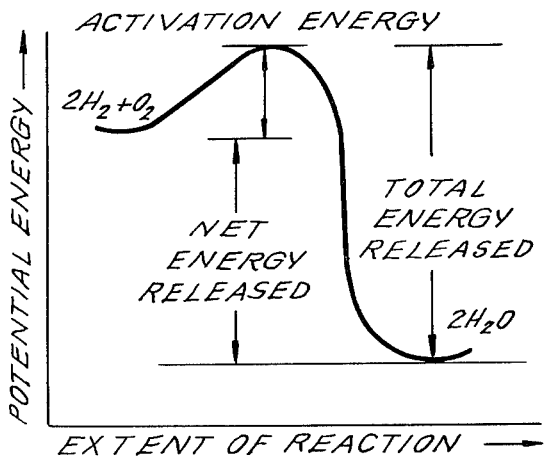

METHOD AND APPARATUS FOR SPLITTING WATER MOLECULES

BACKGROUND OF THE INVENTION

The scientific community has long realized that water is an enormous natural energy resource, indeed an inexhaustible source, since there are over 300 million cubic miles of water on the earth's surface, all of it a potential source of hydrogen for use as fuel. In fact, more than 100 years ago Jules Verne prophesied that water eventually would be employed as a fuel and that the hydrogen and oxygen which constitute it would furnish an inexhaustible source of heat and light.

Water has been split into its constituent elements of hydrogen and oxygen by electrolytic methods, which have been extremely inefficient, by thermochemical extraction processes called thermochemical water-splitting, which have likewise been inefficient and have also been inordinately expensive, and by other processes including some employing solar energy. In addition, artificial chloroplasts imitating the natural process of photosynthesis have been used to separate hydrogen from water utilizing complicated membranes and sophisticated artificial catalysts. However, these artificial chloroplasts have yet to produce hydrogen at an efficient and economical rate.

These and other proposed water splitting techniques are all part of a massive effort by the scientific community to find a plentiful, clean, and inexpensive source of fuel. While none of the methods have yet proved to be commercially feasible, they all share in common the known acceptability of hydrogen gas as a clean fuel, one that can be transmitted easily and economically over long distances and one which when burned forms water.

SUMMARY OF THE PRESENT INVENTION

In classical quantum physical chemistry, the water molecule has two basic bond angles, one angle being 104°, and the other angle being 109°28'.

The present invention involves a method by which a water molecule can be energized by electrical means so as to shift the bond angle from the 104° configuration to the 109°28' tetrahedral geometrical configuration.

An electrical function generator (Component 1) is used to produce complex electrical wave form frequencies which are applied to, and match the complex resonant frequencies of the tetrahedral geometrical form of water.

It is this complex electrical wave form applied to water which is contained in a special thermodynamic device (Component II) which shatters the water molecule by resonance into its component molecules—hydrogen an oxygen.

The hydrogen, in gas form, may then be used as fuel; and oxygen, in gas form is used as oxidant. For example, the thermodynamic device of the present invention may be used as a hydrogen fuel source for any existing heat engine—such as, internal combustion engines of all types, turbines, fuel cell, space heaters, water heaters, heat exchange systems, and other such devices. It can also be used for the de-salinization of sea water, and other water purification purposes. It can also be applied to the development of new closed cycle heat engines where water goes in as fuel, and water comes out as a clean exhaust.

For a more complete understanding of the present invention and for a greater appreciation of its attendant advantages, reference should be made to the following detailed description taken in conjunction with the accompanying drawings.

DESCRIPTION OF THE DRAWINGS

FIG. 1 is a schematic block diagram illustrating the electrical function generator, Component I, employed in the practice of the present invention;

FIG. 2 is a schematic illustration of the apparatus of the present invention, including a cross sectional representation of the thermodynamic device, Component II;

FIG. 4C is an illustration of the geometry of methane ammonia and water molecules;

FIG. 5 is an illustration of an amplitude modulated carrier wave;

FIG. 6 is an illustration of a ripple square wave;

FIG. 6 A is an illustration of uni-polar pulses;

FIG. 7 is a diagram showing ion distribution at the negative electrode;

FIG. 8 is an illustration of tetrahedral bonding orbitals;

FIG. 9 is an illustration of water molecules;

FIG. 10 is an illustration of productive and non-productive collisions of hydrogen with iodine;

FIG. 11 is a wave form found to be the prime characteristic for optimum efficiency;

FIG. 12 is an illustration of pearl chain formation;

FIG. 13 is a plot of the course of the onset of the barrier effect and the unblocking of the barrier effect; and FIGS. 14A, B, and C are energy diagrams for exergonic reactions.

DETAILED DESCRIPTION OF INVENTION

Section 1—Apparatus of Invention

Figure 3:
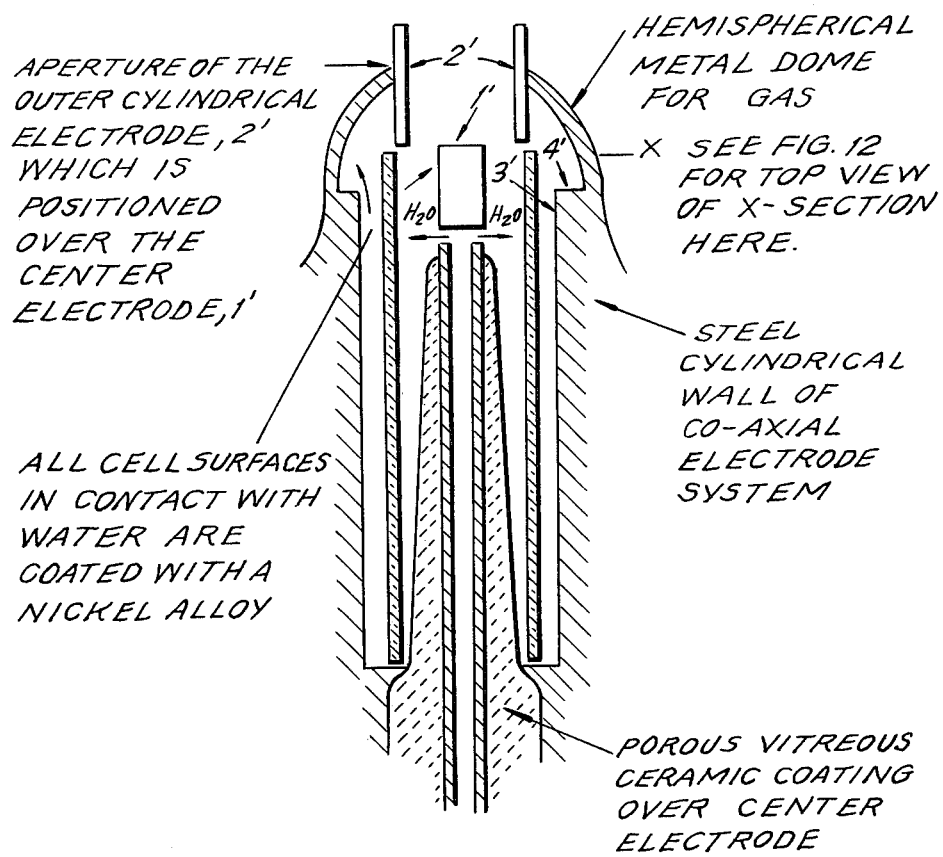
FIG. 3 is a cross-sectional view of Component III of the present invention, the water cell section of Component II.

The apparatus of the invention consists of three components, the electrical function generator, the thermodynamic device, and the water cell.

COMPONENT I. The Electrical Funtion Generator

This device has an output consisting of an audio frequency (range 20 to 200 Hz) amplitude modulation of a carrier wave (range 200 Hz to 100,000 Hz). The impedance of this output signal is continuously being matched to the load which is the second component, the thermodynamic device.

The electrical function generator represents a novel application of circuitry disclosed in my earlier U.S. Pat. Nos. 3,629,521; 3,563,246; and 3,726,762, which are incorporated by reference herein. See FIG. 1 for the block diagram of Component I.

COMPONENT II. The Thermodynamic Device

The thermodynamic device is fabricated of metals and ceramic in the geometric form of coaxial cylinder made up of a centered hollow tubular electrode which is surrounded by a larger tubular steel cylinder, said two electrodes comprising the coaxial electrode system which forms the load of the output of the electrical function generator, Component I. Said center hollow tubular electrode carries water, and is separated from the outer cylindrical electrode by a porous ceramic vitreous material. Between the outer surface of the insulating ceramic vitreous material, and the inner surface of the outer cylindrical electrode exists a space to contain the water to be electrolysed. This water cell space comprises the third component (Component III) of the invention. It contains two lengths of tubular pyrex glass, shown in FIGS. 2 and 3. The metal electrode surfaces of the two electrodes which are in contact with the water are coated with a nickel alloy.

The coaxial electrode system is specifically designed in materials and geometry to energize the water molecule to the end that it might be electrolysed. The center electrode is a hollow tube and also serves as a conductor of water to the Component III cell. The center tubular electrode is coated with a nickel alloy, and surrounded with a porous vitreous ceramic and a glass tube with the exception of the tip that faces the second electrode. The outer cylindrical electrode is made of a heat conducting steel alloy with fins on the outside, and coated on the inside with a nickel alloy. The center electrode, and the cylindrical electrode are electrically connected by an arching dome extension of the outer electrode which brings the two electrodes at one point to a critical gap distance which is determined by the known quenching distance for hydrogen. See FIG. 2 for an illustration of Component II.

COMPONENT III. The Water Cell

The water cell is a part of the upper end of Component II, and has been described. An enlarged schematic illustration of the cell is presented in FIG. 3. The Component III consists of the water and glass tubes contained in the geometrical form of the walls of cell in Component II, the thermodynamic device. The elements of a practical device for the practice of the invention will include:

(A) Water reservoir; and salt reservoir; and/or salt
(B) Water injection system with microprocessor or other controls which sense and regulate (in accordance with the parameters set forth hereinafter):
  a. carrier frequency
  b. current
  c. voltage
  d. RC relaxation time constant of water in the cell
  e. nuclear magnetic relaxation constant of water
  f. temperature of hydrogen combustion
  g. carrier wave form
  h. RPM of an internal combustion engine (if used)
  i. ignition control system
  j. temperature of region to be heated;
(C) An electrical ignition system to ignite the evolved hydrogen gas fuel.

The important aspects of Component III are the tubular vitreous material, the geometry of the containing walls of the cell, and the geometrical forms of the water molecules that are contained in the cell. A further important aspect of the invention is the manipulation of the tetrahedral geometry of the water molecule by the novel methods and means which will be more fully described in the succeeding sections of this specification.

Figure 4:
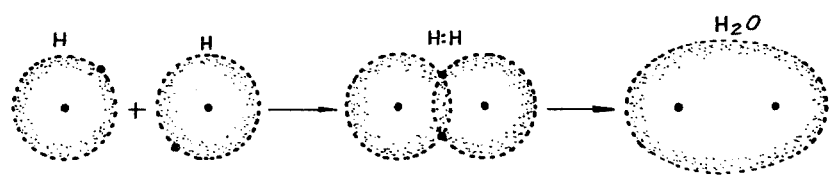
FIG. 4 is an illustration of the hydrogen covalent bond.

The different parts of a molecule are bound together by electrons. One of the electron configurations which can exist is the covalent bond which is achieved by the sharing of electrons. A molecule of hydrogen gas, $H_2$ is the smallest representative unit of covalent bonding, as can be seen in FIG. 4. The molecule of hydrogen gas is formed by the overlap and pairing of 1s orbital electrons. A new molecular orbit is formed in which the shared electron pair orbits both nuclei as shown in FIG. 4. The attraction of the nuclei for the shared electrons holds the atoms together in a covalent bond.

Covalent bonds have direction. The electronic orbitals of an uncombined atom can change shape and direction when that atom becomes part of a molecule. In a molecule in which two or more covalent bonds are present the molecular geometry is dictated by the bond angles about the central atom. The outermost lone pair (non-bonding) electrons profoundly affect the molecular geometry.

The geometry of water illustrates this concept. In the ground state, oxygen has the outer shell configuration

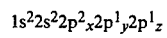

Figure 4A:
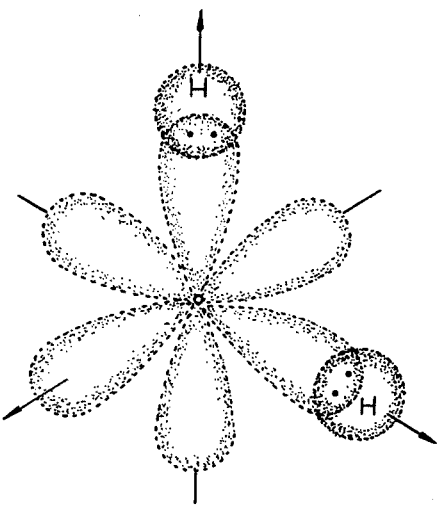
FIG. 4A is an illustration of the hydrogen bond angle.

In water the 1s electrons from two hydrogens bond with the $2p_y$ and $2p_z$ electrons of oxygen. Since p orbitals lie at right angles to each other (see FIG. 4A), a bond angle of 90° might be expected. However, the bond angle is found experimentally to be approximately 104°. Theoretically this is explained by the effect of lone pair electrons on hybridized orbitals.

Figure 4B:
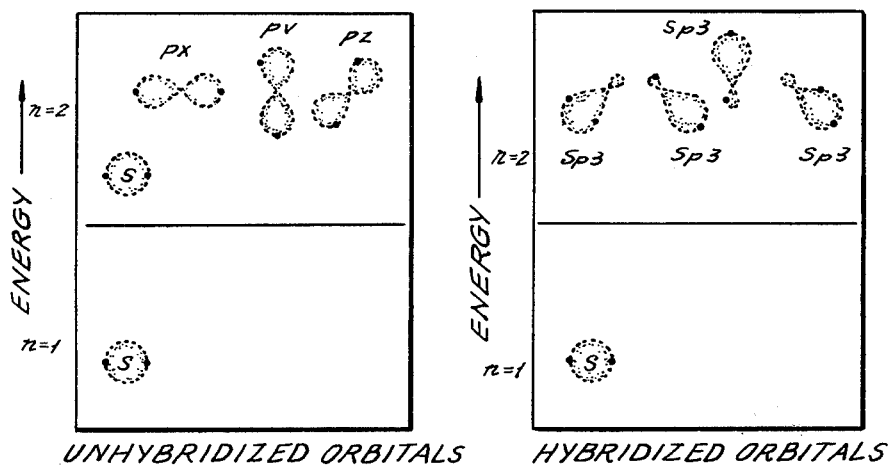
FIG. 4B is an illustration of hybridized and un-hybridized orbitals.

Combined or hybrid orbitals are formed when the excitement of 2s electrons results in their promotion from the ground state to a state energetically equivalent to the 2p orbitals. The new hybrids are termed $sp^3$ from the combination of one s and three p orbitals (See FIG. 4B). Hybrid $sp^3$ orbitals are directed in space from the center of a regular tetrahedron toward the four corners. If the orbitals are equivalent the bond angle will be (See FIG. 15)

consistent with the geometry of a tetrahedron. In the case of water two of the orbitals are occupied by non-bonding electrons (See FIG. 4C). There is greater repulsion of these lone pair electrons which orbit only one nucleus, compared to the repulsion of electrons in bonding orbitals which orbit two nuclei. This tends to increase the angle between non-bonding orbitals so that it is greater than 109°, which pushes the bonding orbitals together, reducing the bond angle to 104°. In the case of ammonia, $NH_3$ where there is only one lone pair, the repulsion is not so great and the bond angle is 107°. Carbon forms typical tetrahedral forms and components the simplest being the gas methane, $CH_4$. (See FIGS. 4C and 8). The repulsion of lone pair electrons affects charge distribution and contributes to the polarity of a covalent bond. (See FIG. 16)

As demonstrated in succeeding sections of this patent specification, a significant and novel aspect of this invention is the manipulation, by electronic methods and means, of the energy level of the water molecule, and the transformation of the water molecule into, and out of, the geometrical form of the tetrahedron. This is made possible only by certain subtle dynamic interactions among the Components I, II, and III of the present invention.

Section 2—Electrodynamics (Pure Water)

The electrodynamics of Components I, II, and III described individually and in interaction during the progress of purewater reaction rate in time. The reactions of saline water will be described in Section 3. It is to be noted that the output of Component I automatically follows the seven stages (hereinafter Stages A-F) of the reaction rate by varying its parameters of resonant carrier frequency, wave form, current voltage and impedance. All the seven states of the reaction herein described are not necessary for the practical operation of the system, but are included in order to explicate the dynamics and novel aspects of the invention. The seven stages are applicable only to the electrolysis of pure water.

STAGE A

Dry Charging of Component II by Component I

To make the new system operational, the Component I output electrodes are connected to component II, but no water is placed in the cell of Component III. When Component I output is across the load of Component II we observe the following electrical parameters are observed:

Range of current (I) output with (dry) load:
  0 to 25 mA (milliamperes) rms.
Range of voltage (E) output with (dry) load:
  0 to 250 Volts (AC) rms.

There is no distortion of the amplitude modulated (AM), or of the sine wave carrier whose center frequency, $f_{c'}$ Ranges between 59,748 Hz to 66, 221 Hz
with $f_c$ average = 62, 985 Hz The carrier frequency varies with the power output in that $f_c$ goes down with an increase in amperes (current). The AM wave form is shown in FIG. 5. It is to be noted here that the electrical function generator, Component I, has an automatic amplitude modulation volume control which cycles the degree of AM from 0% to 100%, and then down from 100% to 0% ≅ every 3.0 seconds. This cycle rate of 3.0 seconds corresponds to the nuclear spin relaxation time, $\tau$/sec, of the water in Component III. The meaning of this effect will be discussed in greater detail in a later section.

In summary, the principal effects to be noted during Stage A -dry charging of Component II are as follows:
a. Tests the integrity of Component I circuitry.
b. Tests the integrity of the coaxial electrodes, and the vitreous ceramic materials of Component II and Component III.
c. Electrostatic cleaning of electrode and ceramic surfaces.

STAGE B

Initial operation of Component I, Component II, and with Component III containing pure water. There is no significant electrolysis of water during Stage B. However, in Stage B the sine wave output of Component I is shaped to a rippled square wave by the changing RC constant of the water as it is treated;

There is an 'Open Circuit' reversible threshold effect that occurs in Component III due to water polarization effects that lead to half wave rectification and the appearance of positive unipolar pulses; and There are electrode polarization effects in Component II which are a prelude to true electrolysis of water as evidenced by oxygen and hydrogen gas bubble formation.

Appearance of Rippled Square Waves

Phase 1: At the end of the Stage A dry charging, the output of Component I is lowered to a typical value of:

$I = 1 mA.$  $E = 24 VAC.$  $f_c \cong 66,234$ Hz.

Phase 2: Then water is added to the Component III water cell drop by drop until the top of the center electrode, 1', in FIG. 3 is covered, and when this water just makes contact with the inner surface of the top outer electrode at 2'. As this coupling of the two electrodes by water happens, the following series of events occur:

Phase 3: The $f_c$ drops from 66,234 Hz, to a range from 1272 Hz to 1848 Hz. The current and voltage both drop, and begin to pulse in entrainment with the water nuclear spin relaxation constant, $\tau = 3.0$ sec. The presence of the nuclear spin relaxation oscillation is proven by a characteristic hysteresis loop on the X-Y axes of an oscillscope.

$I = 0$ to $0.2 mA$ surging at $\tau$ cycle $E = 4.3$ to $4.8 VAC$ surging at $\tau$ cycle The sine wave carrier converts to a rippled square wave pulse which reflects the RC time constant of water, and it is observed that the square wave contains higher order harmonics. See FIG. 6:

With the appearance of the rippled square wave, the threshold of hydrolysis may be detected (just barely) as a vapor precipitation on a cover glass slip placed over the Component III cell and viewed under a low power microscope.

The 'Open Circuit' Reversible Threshold Effect

Phase 4: A secondary effect of the change in the RC constant of water on the wave form shows up as a full half wave rectification of the carrier wave indicating a high level of polarization of the water molecule in tetrahedral form at the outer electrode.

With the already noted appearance of the rippled square wave, and the signs of faint vapor precipitation which indicate the earliest stage of electrolysis, it is possible to test for the presence of a reversible hydrolysis threshold. This test is carried out by creating an open circuit between Components I and II, i.e., no current flows. This is done by lowering the water level between the two electrodes in the region—1' and 2' shown in FIG. 3; or by interrupting the circuit between Component I and II, while the Component I signal generator is on and oscillating.

Immediately, with the creation of an 'open circuit' condition, the following effects occur:

(a) The carrier frequency, $f_c$, shifts from Phase 4 valve 1272 Hz to 1848 Hz to 6128 Hz.

(b) The current and voltage drop to zero on the meters which record I and E, but the oscilloscope continues to show the presence of the peak-to-peak (p-p) voltage, and the waveform shows a remarkable effect. The rippled square wave has disappeared, and in its place there appear unipolar (positive) pulses as follows in FIG. 6A.

The unipolar pulse frequency stabilizes to ca. 5000 Hz. The unipolar pulses undergo a 0 to 1.3 volt pulsing amplitude modulation with $\tau$ at 3.0 seconds.

Thus, there exists a pure open circuit reversible threshold for water electrolysis in which the water molecules are capacitor charging and discharging at their characteristic low frequency RC time constant of 0.0002 seconds. It is to be noted that pure water has a very high dielectric constant which makes such an effect possible. The pulsing amplitude modulation of the voltage is determined by the Hydrogen Nuclear Spin Relaxation constant, where $\tau \cong 3.0$ seconds. It is to be noted that the positive pulse spikes are followed by a negative after-potential. These pulse wave forms are identical to the classic nerve action potential spikes found in the nervous system of all living species that have a nervous system. The fact that these unipolar pulses were observed arising in water under the conditions of reversible threshold hydrolysis has a profound significance. These findings illuminate and confirm the Warren McCulloch Theory of water "crystal" dynamics as being the foundation of neural dynamics; and the converse theory of Linus Pauling which holds that water clathrate formation is the mechanism of neural anesthesia.

Phase 5: The effects associated with reversible threshold electrolysis are noted only in passim since they reflect events which are occurring on the electrode surfaces of Component II, the Thermodynamic Device.

A principal effect that occurs in Stage B, Phase 3, in Component II, the thermodynamic device, is that the two electrodes undergo stages of polarization. It has been observed in extensive experiments with different kinds of fluids in the cell of Component II i.e., distilled water, sea water, tap water, Ringers solution, dilute suspensions of animal and human blood cells, that the inner surface of the outer ring electrode at 3' in FIG. 3 (the electrode that is in contact with the fluid) becomes negatively charged. Referring to FIG. 7, this corresponds to the left hand columnar area marked, Electrode $\ominus$.

Electrode Polarization Effects at the Interface Between Components II and III

Concurrently with the driver pulsing of Component I at the $\tau$ constant cycle which leads to electrode polarization effects in Component II, there is an action on Component III which energizes and entrains the water molecule to a higher energy level which shifts the bond angle from 104° to the tetrahedral form with angle 109°28' as shown in FIGS. 8 and 15. This electronic pumping action is most important, and represents a significant part of the novel method of this invention for several reasons. First, the shift to the tetrahedral form of water increases the structural stability of the water molecule, thereby making it more susceptible to breakage at the correct resonant frequency, or frequencies. Second, increasing the polarization of the water molecule makes the lone pair electrons, S— connected with the oxygen molecule more electronegative; and the weakly positive hydrogen atoms, S+ more positive. See FIG. 9 and FIG. 22.

As the outer electrode becomes more electronegative, the center electrode concomitantly becomes more electropositive as will be shown. As the polarity of the water molecule tetrahedron increases, a repulsive force occurs between the two S+ apices of the water tetrahedron and the negatively charged electrode surface within the region of the Helmholtz layer, as shown in FIG. 7. This effect "orients" the water molecule in the field, and is the well-known "orientation factor" of electrochemistry which serves to catalyse the rate of oxygen dissociation from the water molecule, and thereby causes the reaction rate to proceed at the lowest energy levels. See FIG. 10 for an example of how the orientation factor works.

Near the end of Stage B, the conditions are established for the beginning of the next stage, the stage of high efficiency electrolysis of water.

STAGE C

Generation of the complex wave form frequencies from Component I to match the complex wave form resonant frequencies of the energized and highly polarized water molecule in tetrahedral form with angles, 109°28' are carried out in Stage C.

In the operation of the invention active bubble electrolysis of water is initiated following Stage B, phase 3 by setting (automatically) the output of Component I to:

$$I = 1 mA., \quad E = 22 VAC-rms,$$

causing the rippled square wave pulses to disappear with the appearance of a rippled sawtooth wave. The basic frequency of the carrier now becomes, $f_c = 3980$ Hz.

The wave form now automatically shifts to a form found to be the prime characteristic necessary for optimum efficiency in the electrolysis of water and illustrated in FIG. 11. In the wave form of FIG. 11, the fundamental carrier frequency, $f_c = 3980$ Hz., and a harmonic modulation of the carrier is as follows:

1st Order Harmonic Modulation (OHM) = 7960 Hz.
2nd Order Harmonic Modulation (II OHM) = 15,920 Hz.
3rd Order Harmonic Modulation (III OHM) = 31,840 Hz.
4th Order Harmonic Modulation (IV OHM) = 63,690 Hz.

What is believed to be happening in this IV OHM effect is that each of the four apices of the tetrahedron water molecule is resonant to one of the four harmonics observed. It is believed that the combination of negative repulsive forces at the outer electrode with the resonant frequencies just described work together to shatter the water molecule into its component hydrogen and oxygen atoms (as gases). This deduction is based on the following observations of the process through a low power microscope. The hydrogen bubbles were seen to originate at the electrode rim, 4', of FIG. 3. The bubbles then moved in a very orderly 'pearl chain' formation centripetally (like the spokes of a wheel) toward the center electrode, 1' of FIG. 3. FIG. 12 shows a top view of this effect.

Thereafter, upon lowering the output of Component I, the threshold for electrolysis of water as evidenced by vapor deposition of water droplets on a glass cover plate over the cell of Component III, is:

$$\left. \begin{array}{l} I = mA. \\ E = 10 \text{ volts} \end{array} \right\} = 10 \, mw.$$

with all other conditions and waveforms as described under Stage C, supra. Occasionally, this threshold can be lowered to:

$$I = mA.$$

$$E = 2.6 \text{ volts} \left.\begin{array}{l}\text{-continued}\\ = 2.6 \text{ mw.}\end{array}\right\}$$

This Stage C vapor hydrolysis threshold effect cannot be directly observed as taking place in the fluid because no bubbles are formed—only invisible gas molecules which become visible when they strike a glass plate and combine into water molecules and form droplets which appear as vapor.

STAGE D

Production of hydrogen and oxygen gas at an efficient rate of water electrolysis is slowed in Stage D when a barrier potential is formed, which barrier blocks electrolysis, irrespective of the amount of power applied to Components II and III.

A typical experiment will illustrate the problems of barrier potential formation. Components I, II, and III are set to operate with the following parameters:

$$\left.\begin{array}{l}I = 1 \text{ mA.}\\ E = 11.2 \text{ volts}\end{array}\right\} = \begin{array}{l}11.2 \text{ mw. (at the start)}\\ \text{(rising to 100 mw.)}\end{array}$$

This input to Component III yields, by electrolysis of water, approximately 0.1 cm³ of hydrogen gas per minute at one atmosphere and 289° K. It is observed that as a function of time the $f_c$ crept up from 2978 Hz to 6474 Hz over 27 minutes. The current and the voltage also rose with time. At the 27th minute a barrier effect blocked the electrolysis of water, and one can best appreciate the cycle of events by reference to FIG. 13.

STAGE E

The Anatomy of the Barrier Effect

Region A: Shows active and efficient hydrolysis

Region B: The barrier region effect can be initiated with taps of the finger, or it can spontaneously occur as a function of time.

Phase a: The current rose from 1 mA to 30 mA. The voltage fell from 22 volts to 2.5 V.

Phase b: If component II is tapped mechanically during Phase a supra—it can be reversed as follows: The current dropped from 30 Ma to 10 Ma. The voltage shot up from 5 volts to over 250 volts (off scale).

Throughout Phase a and Phase b, all hydrolysis has ceased. It was observed under the microscope that the inner surface of the outer electrode was thickly covered with hydrogen gas bubbles. It was reasoned that the hydrogen gas bubbles had become trapped in the electrostricted layer, because the water molecule tetrahedrons had flipped so that the S+ hydrogen apices had entered the Helmholtz layer and were absorbed to the electronegative charge of the electrode. This left the S− lone pair apices facing the electrostricted layer. This process bound the newly forming H+ ions which blocked the reaction $$H^+ + H^+ + 2e \rightarrow H_2(\text{gas})$$

STAGE F

Region C: It was found that the barrier effect could be unblocked by some relatively simple procedures:

(a) Reversing the output electrodes from Component I to Component II, and/or:

(b) Mechanically tapping the Component III cell at a frequency T/2 = 1.5 seconds per tap.

These effects are shown in FIG. 12 and induce the drop in barrier potential from:

$$\left.\begin{array}{l}E = /250 \text{ volts to 4 volts}\\ I = 10 \text{ mA to 1 mA}\end{array}\right\} = 4 \text{ mw. (final state)}$$

Upon unblocking of the barrier effect, electrolysis of water resumed with renewed bubble formation of hydrogen gas.

The barrier potential problem has been solved for practical application by lowering the high dielectric constant of pure water, by adding salts (NaCl, KOH, etc.) to the pure water thereby increasing its conductivity characteristics. For optimum efficiency the salt concentration need not exceed that of sea water (0.9% salinity) in Section 3, "Thermodynamics of the Invention", it is to be understood that all water solutions described are not "pure" water as in Section B, but refer only to *salinized* water.

Section 3—The Thermodynamics of the Invention (Saline Water)

Introduction (water, hereinafter refers to salinized water)

The thermodynamic considerations in the normal operations of Components I, II, and III in producing hydrogen as fuel, and oxygen as oxidant during the electrolysis of water, and the combustion of the hydrogen fuel to do work in various heat engines is discussed in this section.

In chemical reactions the participating atoms form new bonds resulting in compounds with different electronic configurations. Chemical reactions which release energy are said to be exergonic and result in products whose chemical bonds have a lower energy content than the reactants. The energy released most frequently appears as heat. Energy, like matter, can neither be created nor destroyed according to conservation law. The energy released in a chemical reaction plus the lower energy state of the products is equal to the original energy content of the reactants. The burning of hydrogen occurs rather violently to produce water as follows:

$2H_2 + O_2 \rightarrow 2H_2O - \Delta H$ 68.315 Kcal/mol (this is the enthalpy, or heat of combustion at constant pressure)

(18 gms) = 1 mol

The chemical bonds of the water molecules have a lower energy content than the hydrogen and oxygen gases which serve at the reactants. Low energy molecules are characterized by their ability. High energy molecules are inherently unstable. These relations are summarized in the two graphs of FIG. 14. It is to be noted that FIG. 14 (b) shows the endergonic reaction aspect of the invention when water is decomposed by electrolysis into hydrogen and oxygen. FIG. 14 (a) shows the reaction when the hydrogen and oxygen gases combine, liberate energy, and re-form into water. Note that there is a difference in the potential energy of the two reactions. FIG. 14 (c) shows that there are two components to this potential energy. The net energy released, or the energy that yields net work is labelled in the diagram as Net Energy released, and is more properly called the free energy change denoted by the Gibbs function, $-\Delta G$. The energy which must be supplied for a reaction to achieve (burning) spontaneity is called the activation energy. The sum of the two is the total energy released. A first thermodynamic subtlety of the thermodynamic device of the invention is noted in Angus McDougall's FUEL CELLS, Energy Alternative Series, The MacMillan Press Ltd., London, 1976, page 15 it is stated:

"The Gibbs function is defined in terms of the enthalpy H, and the entropy S of the system:

$G = H - T S$ (where $\tau$ is the thermodynamic temperature)

A particularly important result is that for an electrochemical cell working reversibly at constant temperature and pressure, the *electrical* work *done* is the *net work* and hence, $$\Delta G = - w_e$$

For this to be a reversible process, it is necessary for the cell to be on 'open circuit', that is, no current flows and the potential difference across the electrodes is the EMF, E. Thus, $$\Delta G = - zFE$$

(where F is the Faraday constant—the product of the Avogadro Constant $+ N_A = 6.022045 \times 10^{23}$ mole$^{-1}$, and the charge on the electron, $e = 1.602\ 189 \times 10^{-19}$ C—both in SI units; and z is the number of electrons transported.) When the cell reaction proceeds from left to right."

It is to be noted that the activation energy is directly related to the controlling reaction rate process, and thus is related to the Gibbs free energy changes.

The other thermodynamic subtlety is described by S. S. Penner in his work:

Penner, S. S. and L. Icerman, ENERGY, Vol, II, Non-Nuclear Energy Technologies. Addison-Wesley Publishing Company, Inc. Revised Edition, 1977. Reading, Mass. Page 140 ff.

"It should be possible to improve the efficiency achieved in practical electrolysis to about 100% because, under optimal operating conditions, the theoretically-attainable energy conversion by electrolysis is about 120% of the electrical energy input. The physical basis for this last statement will now be considered.

"A useful definition for energy efficiency in electrolysis is the following: the energy efficiency is the ratio of the energy released from the electrolysis products formed (when they are subsequently used) to the energy required to effect electrolysis. The energy released by the process $H_2$ (gas) $+ (\frac{1}{2}) O_2$ (gas) $\rightarrow H_2O$ (liquid)

under standard conditions (standard conditions in this example are: (1) atmospheric pressure = 760 mm Hg and (2) temperature = 298.16° K. = 25° C. = 77° F.) is 68.315 Kcal and is numerically equal to the enthalph change ($\Delta H$) for the indicated process. On the other hand, the *minimum* energy (or useful work input) required at constant temperature and pressure for electrolysis equals the Gibbs free energy change ($\Delta G$). There is a basic relation derivable from the first and second laws of thermodynamics for isothermal changes, which shows that $$\Delta G = \Delta H - T \Delta S$$

where $\Delta S$ represents the entropy change for the chemical reaction. The Gibbs free energy change ($\Delta G$) is also related to the voltage (E) required to implement electrolysis by Faraday's equation, viz.

$$E = (\Delta G / 23.06 n) \text{ volts}$$

where $\Delta G$ is in Kcal/mol and n is the number of electrons (or equivalents) per mol of water electrolyzed and has the numerical value 2.

"At atmospheric pressure and 300° K., $\Delta H = 68.315$ Kcal/mol of $H_2O$ (i) and $\Delta G = 56.62$ Kcal/mole of $H_2O$ (i) for the electrolysis of liquid water. Hence, the energy efficiency of electrolysis at 300° K. is about 120%."

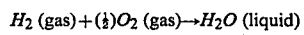

$$\frac{\Delta G}{\Delta G} = 120\%$$

"(When) $H_2$ (gas) and $O_2$ (gas) are generated by electrolysis, the electrolysis cell must absorb heat from the surroundings, in order to remain at constant temperature. It is this ability to produce gaseous electrolysis products with heat absorption from the surroundings that is ultimately responsible for energy-conversion efficiencies during electrolysis greater than unity."

Using the criteria of these two authorities, it is possible to make a rough calculation of the efficiency of the present invention.

Section 4—Thermodynamic Efficiency of the Invention

Efficiency is deduced on the grounds of scientific accounting principles which are based on accurate measurements of total energy input to a system (debit), and accurate measurements of total energy (or work) obtained out of the system (credit). In principle, this is followed by drawing up a balance sheet of energy debits and credits, and expressing them as an efficiency ration, $\eta$.

$$\eta = \frac{\text{Credit}}{\text{Debit}} = \frac{\text{Energy Out}}{\text{Energy In}} = <1$$

The energy output of Component I is an alternating current looking into a highly non-linear load, i.e., the water solution. This alternating current generator (Component I) is so designed that at peak load it is in resonance (Components I, II, III), and the vector diagrams show that the capacitive reactance, and the inductive reactance are almost exactly 180° out of phase, so that the net power output is reactive, and the dissipative power is very small. This design insures minimum power losses across the entire output system. In the experiments which are now to be described the entire emphasis was placed on achieving the maximum gas yield (credit) in exchange for the minimum applied energy (debit).

The most precise way to measure the applied energy to Components II and III is to measure the Power, P, in Watts, W. This was done by precision measurements of the volts across Component II as root mean square (rms) volts; and the current flowing in the system as rms amperes. Precisely calibrated instruments were used to take these two measurements. A typical set of experiments (using water in the form of 0.9% saline solution =0.1540 molar concentration) to obtain high efficiency hydrolysis gave the following results:

rms Current=I=25 mA to 38 mA (0.025 A to 0.038 A)

rms Volts=E=4 Volts to 2.6 Volts

The resultant ratio between current and voltage is dependent on many factors, such as the gap distance between the center and ring electrodes, dielectric properties of the water, conductivity properties of the water, equilibrium states, isothermal conditions, materials used, and even the presence of clathrates. The above current and voltage values reflect the net effect of various combinations of such parameters. The product of rms current, and rms volts is a measure of the power, P in watts:

$P = I \times E = 25\ mA \times 4.0\ volts = 100\ mW(0.1\ W)$ $P = I \times E = 38\ mA \times 2.6\ volts = 98.8\ mW(0.0988\ W)$ At these power levels (with load), the resonant frequency of the system is 600 Hz ($\pm$5 Hz) as measured on a precision frequency counter. The wave form was monitored for harmonic content on an oscilloscope, and the nuclear magnetic relaxation cycle was monitored on an X-Y plotting oscilloscope in order to maintain the proper hysteresis loop figure. All experiments were run so that the power in Watts, applied through Components I, II, and III ranged between 98.8 mW to 100 mW.

Since, by the International System of Units—1971 (SI), One-Watt-second (Ws) is exactly equal to One Joule (J), the measurements of efficiency used these two yardsticks (1 Ws=1 J) for the debit side of the measurement.

The energy output of the system is, of course, the two gases, hydrogen ($H_2$) and oxygen ($\frac{1}{2}O_2$), and this credit side was measured in two laboratories, on two kinds of calibrated instruments, namely, a Gas Chromatography Machine, and, a Mass Spectrometer Machine.

The volume of gases, $H_2$ and $(\frac{1}{2})O_2$, was measured as produced under standard conditions of temperature and pressure in unit time, i.e., in cubic centimeters per minute (cc/min), as well as the possibly contaminating gases, such as air oxygen, nitrogen and argon; carbon monoxide, carbon dioxide, water vapor, etc.

The electrical, and gas, measurements were reduced to the common denominator of Joules of energy so that the efficiency accounting could all be handled in common units. The averaged results from many experiments follow. The Standard Error between different samples, machines, and locations is $\pm$10%, and only the mean was used for all the following calculations.

Section 5—Endergonic Decomposition of Liquid Water

Thermodynamic efficiency for the endergonic decomposition of liquid water (salinized) to gases under standard atmosphere (754 to 750 m.m. Hg), and standard isothermal conditions @ 25° C.=77° F.=298.16° K., according to the following reaction:

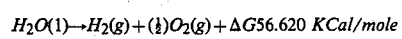
$H_2O(l) \rightarrow H_2(g) + (\frac{1}{2})O_2(g) + \Delta G 56.620\ KCal/mole$ As already described, $\Delta G$ is the Gibbs function (FIG. 14b). A conversion of Kcal to the common units, Joules, by the formula, One Calorie=4.1868 Joules was made.

$\Delta G = 56.620\ Kcal \times 4.1868\ J = 236,954\ J/mol\ of\ H_2O$ (1) where, 1 mole is 18 gms.

$\Delta G$ = the free energy required to yield an equivalent amount of energy from $H_2O$ in the form of the gases, $H_2$ and $(\frac{1}{2})O_2$.

To simplify the calculations, the energy required to produce 1.0 c.c. of $H_2O$ as the gases, $H_2$ and $(\frac{1}{2})O_2$ was determined. There are (under standard conditions) 22,400 c.c.=V, of gas in one mole of $H_2O$. Therefore, $$\frac{\Delta G}{V} = \frac{236,954\ J}{22,400\ cc}\ 10.5783\ J/cc$$

The electrical energy required to liberate 1.0 cc of the $H_2O$ gases (where $H_2 = 0.666$ parts, and $(\frac{1}{2})O_2 = 0.333$ parts, by volume) from liquid water is then determined. Since P=1 Ws=1 Joule, and V=1.0 cc of gas =10.5783 Joules, then, $$PV = 1\ J \times 10.5783\ J = 10.5783\ J$$
$$= 10.5783\ Ws$$

Since the experiments were run at 100 mW (0.1 W) applied to the water sample in Component II, III, for 30 minutes, the ideal (100% efficient) gas production at this total applied power level was calculated.

$0.1\ Ws \times 60\ sec \times 30\ min = 180.00$ Joules (for 30 min)

The total gas production at Ideal 100% efficiency is, $180.00\ J/10.5783\ J/cc = 17.01\ cc\ H_2O\ (g)$ The amount of hydrogen present in the 17.01 cc $H_2O$ (g) was then calculated.

$17.01\ cc\ H_2O\ (gas) \times 0.666\ H_2\ (g) = 11.329\ cc\ H_2\ (g)$ $17.01\ cc\ H_2O\ (g) \times 0.333(\frac{1}{2})O_2\ (g) = 5.681\ cc\ (\frac{1}{2})O_2\ (g)$ Against this ideal standard of efficiency of expected gas production, the actual amount of gas produced was measured under: (1) standard conditions as defined above (2) 0.1 Ws power applied over 30 minutes. In the experiments, the mean amount of $H_2$ and $(\frac{1}{2})O_2$ produced, as measured on precision calibrated GC, and MS machines in two different laboratories, where the S.E. is $\pm$10%, was,

| Measured Mean = | 10.80 cc $H_2(g)$ |
|---|---|
| Measured Mean = | 5.40 cc $(\frac{1}{2})\ O_2(g)$ |
| Total Mean = | 16.20 cc $H_2O(g)$ |

The ratio, $\eta$, between the ideal yield, and measured yield, $$\eta = \frac{Measured\ H_2(g)}{Ideal\ H_2(g)} = \frac{10.80\ cc}{11.33\ cc} = 91.30\%$$

Section 6—Energy Release

The total energy release (as heat, or electricity) from an exergonic reaction of the gases, $H_2$ and $O_2$, is given by,

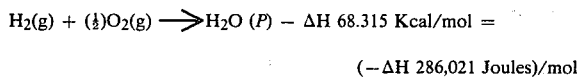

$$(-\Delta H\ 286{,}021\ \text{Joules})/\text{mol}$$

It is possible (Penner, Op. Cit., p. 128) to get a total heat release, or total conversion to electricity in a fuel cell, in the above reaction when the reactants are initially near room temperature (298.16° K.), and the reactant product (H₂O) is finally returned to room temperature. With this authoritative opinion in mind, it is desirable to determine the amount of energy released (ideal) from the exergonic experiment. The total energy of 1.0 cc of $H_2O$ (1), as above is:

$$1.0\ cc\ \Delta H = \frac{286{,}021\ \text{J/mol}}{22{,}400\ \text{cc/mol}} = 12.7687\ \text{J/cc}\ H_2O\ (1)$$

for $H_2 = 12.7687 \times 0.666 = 8.509$ J/0.66 cc $H_2$
for $O_2 = 12.7687 \times 0.333 = 4.259$ J/0.33 cc $(\frac{1}{2})O_2$ The energy produced from the gases produced in the experiments in an exergonic reaction was, $$16.20\ cc\ H_2O\ (g) \times 12.7687\ \text{J/cc}\ H_2O = 206{,}8544\ J.$$

The overall energy transaction can be written as, $$\frac{\text{EXERGONIC}}{\text{ENDERGONIC}} = \eta = \frac{-\Delta H}{+\Delta G} = \frac{206.8544\ J}{180{,}000\ J} =$$

$$1.14919 = 114.92\%$$

In practical bookkeeping terms the balance of debits and credits, $n = (-\Delta H) - (+\Delta G)$, so, $n = 206.8544$ J $- 180.0 = +26.8544$ J (surplus)

Since, in the invention, the gas is produced where and when needed, there is no additional cost accounting for liquifaction, storage, or transportation of the hydrogen fuel, and the oxygen oxidant. Therefore, the practical efficiency, is $$\eta_P = \frac{26.8544\ J}{180.0000\ J} =$$

14.919% (as net return on the original energy investment)

In practical applications, the energy output (exergonic) of the Component II System can be parsed between the electrical energy required to power the Component I System, as an isothermal closed loop; while the surplus of approximately 15% can be shunted to an engine (heat) electrical, battery, etc.) that has a work load. Although this energy cost accounting represents an ideal model, it is believed that there is enough return (app. 15%) on the capital energy investment to yield a net energy profit that can be used to do useful work.

Conclusion

From the foregoing disclosure it will be appreciated that the achievement of efficient water splitting through the application of complex electrical waveforms to energized water molecules, i.e. tetrahedral molecules having bonding angles of 109° 28', in the special apparatus described and illustrated, will provide ample and economical production of hydrogen gas and oxygen gas from readily available sources of water. It is to be understood, that the specific forms of the invention disclosed and discussed herein are intended to be representative and by way of illustrative example only, since various changes may be made therein without departing from the clear and specific teachings of the disclosure. Accordingly, reference should be made to the following appended claims in determining the full scope of the method and apparatus of the present invention.

I claim:
1. A method for splitting water molecules into hydrogen and oxygen comprising
   (a) generating complex electrical wave forms matching the complex wave form resonant frequencies of tetrahedral water molecules;
   (b) applying said generated wave forms in resonance to said water molecules to shatter said molecules, thereby liberating hydrogen and oxygen.
2. The method of claim 1, in which
   (a) the bond angles of said tetrahedral water molecules are approximately 109°.
3. The method of claim 1, in which
   (a) said water molecules are saline water molecules.
4. The method of claim 1, in which
   (a) the bond angles of said tetrahedral water molecules are 109° 28'.
5. The method of claim 1, in which
   (a) the applied complex wave form is a signal in the form of an audio-frequency, amplitude modulated carrier wave;
   (b) the water molecules are supplied to a cell during electrolysis;
   (c) the impedance of said signal is matched continuously with that of said cell during the electrolysis of said molecules.
6. The method of claim 5, in which
   (a) the audio frequency is in the range of 20 to 200 Hz.;
   (b) the carrier wave is in the range of 200–100,000 Hz.
7. Apparatus for splitting water molecules into hydrogen and oxygen comprising
   (a) water cell means including a pair of electrode means;
   (b) means for supplying water molecules to said cell means;
   (c) means for generating signals in the forms of complex electrical waves having resonant frequencies of tetrahedral water molecules;
   (d) means for applying said generated signals to said electrode means;
   (e) means to recover liberated hydrogen and oxygen from said cell means.
8. The apparatus of claim 7, in which
   (a) said electrode means includes an outer cylindrical electrode of steel alloys coated on its inner surfaces with a nickel alloy and an inner coaxial hollow tubular electrode coated on its outer surface with a nickel alloy;
   (b) said signal generating means, including means matching the impedance of said generated signal with that of said electrodes.
9. The apparatus of claim 8, in which
   (a) said outer electrode includes integral fins;
   (b) porous vitreous ceramic means, are disposed about said center electrode;
   (c) a pair of spaced cylindrical glass tubes, one of which surrounds said vitreous ceramic means are disposed in said water cell means;
   (d) the uppermost portion of said outer electrode is generally hemispherically shaped;
   (e) the other of said glass tubes extends upwardly through said outer electrode and forms a gas vent for said cell means.

* * * * *